United States Patent [19]
Gibson et al.

[11] Patent Number: 5,488,717
[45] Date of Patent: Jan. 30, 1996

[54] MTREE DATA STRUCTURE FOR STORAGE, INDEXING AND RETRIEVAL OF INFORMATION

[75] Inventors: Seann Gibson; Kerr Gibson, both of Columbus, Ohio

[73] Assignee: 1st Desk Systems, Inc., Medway, Mass.

[21] Appl. No.: 909,170

[22] Filed: Jul. 6, 1992

[51] Int. Cl.$^6$ .................................................. G06F 17/30
[52] U.S. Cl. ............... 395/600; 364/419.07; 364/419.08; 364/419.11; 364/715.02; 364/975; 364/974; 364/282.1; 364/260.6; 364/253; 364/222.82; 364/DIG. 1; 364/DIG. 2; 341/55
[58] Field of Search .................. 395/600; 364/419.08, 364/419.07, 419.11, 715.02

[56] References Cited

U.S. PATENT DOCUMENTS

| | | | |
|---|---|---|---|
| 4,464,650 | 8/1984 | Eastman et al. | 341/51 |
| 4,677,550 | 6/1987 | Ferguson | 395/600 |
| 5,153,591 | 10/1992 | Clark | 341/51 |
| 5,202,986 | 4/1993 | Nickel | 395/600 |
| 5,274,805 | 12/1993 | Ferguson et al. | 395/600 |
| 5,295,261 | 3/1994 | Simonetti | 395/600 |
| 5,329,405 | 7/1994 | Hou et al. | 395/800 |

OTHER PUBLICATIONS

T. D. M. Purdin, "Compressing Tries for Storing Dictionaries", *Proceedings of the 1990 Symposium on Applied Computing*, 5–6 Apr., Fayetteville, Arkansas, pp. 336–340.

Toshiyuki Masui, "Keyword Dictionary Compression Using Efficient Trie Implementation", *DCC '91. Data Compression Conference*, Snowbird Utah, 8–11 Apr. 1991, p. 438.

*Primary Examiner*—Thomas G. Black
*Assistant Examiner*—Paul R. Lintz
*Attorney, Agent, or Firm*—Morse, Altman, Dacey & Benson

[57] ABSTRACT

Data storage space and data access time are significantly decreased by utilizing a tree structure to store data in memory. Only one copy of each data element common to different data units is stored. Each data element is stored in a node that has a next pointer and an alternate pointer. The next pointer points to a list of alternatives for the next sequential element of the data unit. The alternate pointer defines that list of alternatives. Thus, a progression of next pointers and alternate pointers corresponds to a unique data unit. Associated with each data unit is one or more identifiers, which tie the data unit to data units in another trees or to external objects. The last alternate pointer in an alternative list points back to the preceding element of the data unit in order to reconstruct a data unit from the identifier. Nodes in memory that are not currently being used in the tree are linked together to form a list of free nodes.

21 Claims, 21 Drawing Sheets

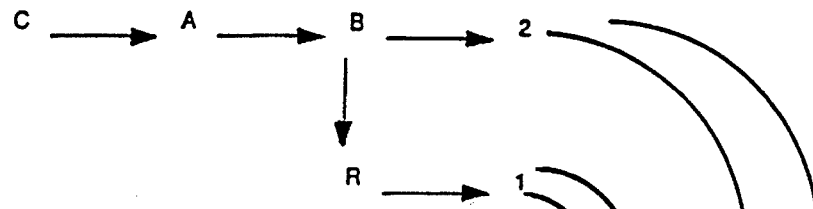
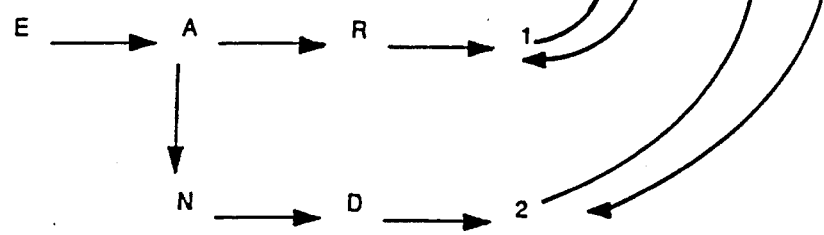
Fig. 9
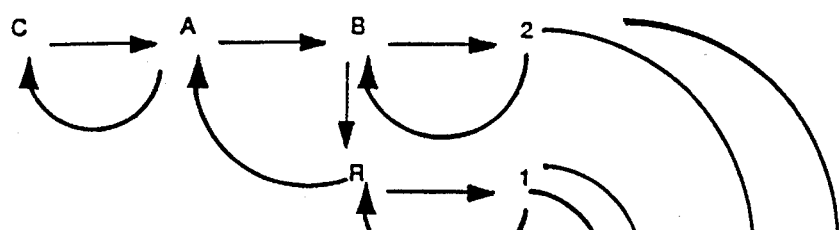
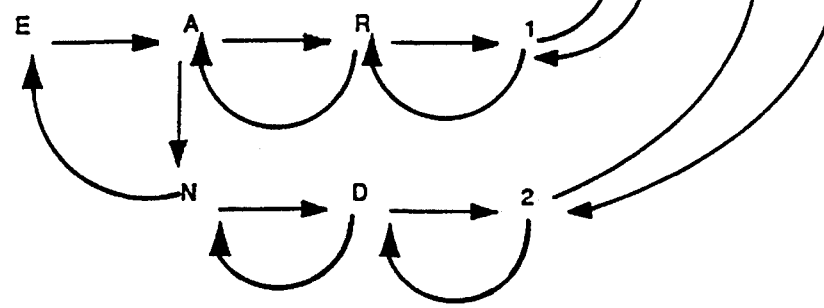
Fig. 10

Fig. 11

```
#include <stdio.h>
#include <stdlib.h>
#define      FREEISATEND      (long)-1
#define      NONODE           (long)0
typedef struct {
        char  c;
        char  future;      ←—130
        long  next;
        long  alternate;
} MNode, *MNodePtr;
typedef struct {
        long  rootNode;
        long  freeNode;    ←—132
        long  lastNode;
        long  nodeCount;
        MNode MNodes[];
} MTree, *MTreePtr;
```

```
MTreePtr  createMTree(long howManyNodes);
void      disposeMTree(MTreePtr theMTree);

void      addMTree(MTreePtr theMTree, char *s, long len);
long      addAlternate(MTreePtr theMTree, long currentNode, char *s, long len);
void      addRestOfString(MTreePtr theMTree, long currentNode, char *s, long len);

void      deleteMTree(MTreePtr theMTree, char *s, long len);
long      deleteAlternate(MTreePtr theMTree, long priorNode, long currentNode);
void      deleteRestOfString(MTreePtr theMTree, long currentNode);

long      seekMTree(MTreePtr theMTree, char *s, long len);

long      getNewNode(MTreePtr theMTree);
void      freeANode(MTreePtr theMTree, long nodeToFree);
```

Fig. 12

```
#include "MetaTree.h"
MTreePtr createMTree(long howManyNodes)
{
MTreePtr    newMTree;

newMTree = (MTreePtr)malloc(sizeof(MTree) + (howManyNodes * sizeof(MNode)

if (newMTree != NULL) {
        newMTree->rootNode = (long)0;

newMTree->freeNode = FREEISATEND;
        newMTree->lastNode = 1;
        newMTree->nodeCount = howManyNodes;

newMTree->MNodes[newMTree->rootNode].c         = 0;
        newMTree->MNodes[newMTree->rootNode].future    = 0;
        newMTree->MNodes[newMTree->rootNode].next      = NONODE;
        newMTree->MNodes[newMTree->rootNode].alternate = NONODE;
    } return(newMTree);
}
void disposeMTree(MTreePtr theMTree)
{
    free(theMTree);
}
```

Fig. 13

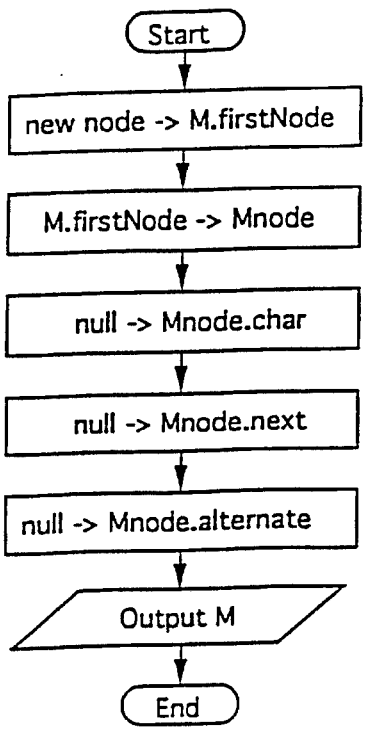

Fig. 14

```
#include "MetaTree.h"
void addMTree(MTreePtr theMTree, char *s, long len)
{
MNodePtr    localMNodes;
MNodePtr    currentMNodePtr;              ←──134
long        currentNode;
long        lastNode;
*/
short       done;

localMNodes      = theMTree->MNodes;
        currentNode      = theMTree->rootNode;

done = FALSE;
        while (!done) { currentMNodePtr   = &localMNodes[currentNode];

if (*s != currentMNodePtr->c) {
                        lastNode = currentNode;
                        currentNode = currentMNodePtr->alternate;
                        if (currentNode == NONODE) {
                                currentNode = addAlternate(theMTree,lastNode,s,len);
                                addRestOfString(theMTree,currentNode,++s,--len);
                                done = TRUE;
                        }
                }            ←──136
                else {
                        ++s;
                        if (--len == 0)
                                done = TRUE;
                        else {
                                lastNode = currentNode;
                                currentNode = currentMNodePtr->next;
                                if (currentNode == NONODE) {
                                        addRestOfString(theMTree,lastNode,s,len);
                                        done = TRUE;
                                }
                        }
                }
        }              ←──138
}
long addAlternate(MTreePtr theMTree, long currentNode, char *s, long len)
{
MNodePtr    localMNodes;
MNodePtr    currentMNodePtr;       ←──140
long        newNode;
```

Fig. 15

```
        MNodePtr    newNodePtr;

if (len > 0) {
                    localMNodes        = theMTree->MNodes;
                    currentMNodePtr    = &localMNodes[currentNode];

newNode            = getNewNode(theMTree);
                    newNodePtr         = &localMNodes[newNode];

newNodePtr->c              = *s;
                    newNodePtr->future         = 0;
                    newNodePtr->next           = NONODE;
                    newNodePtr->alternate      = currentMNodePtr->alternate;

currentMNodePtr->alternate = newNode;
            }
            else
                    newNode = currentNode;

return newNode;              ◄──142
}
void addRestOfString(MTreePtr theMTree, long currentNode, char *s, long len)
{
MNodePtr    localMNodes;
MNodePtr    currentMNodePtr;    ◄──144
long        newNode;
MNodePtr    newNodePtr;

localMNodes        = theMTree->MNodes;
            currentMNodePtr    = &localMNodes[currentNode];

while (len > 0) {
                    newNode            = getNewNode(theMTree);
                    newNodePtr         = &localMNodes[newNode];

newNodePtr->c              = *s;
                    newNodePtr->future         = 0;
                    newNodePtr->alternate      = NONODE;
                    newNodePtr->next           = NONODE;

currentMNodePtr->next      = newNode;

currentMNodePtr    = newNodePtr;

++s;
                    --len;
            }
}
```

Fig. 16

```
#include "MetaTree.h"
long seekMTree(MTreePtr theMTree, char *s, long len)
{
MNodePtr    localMNodes;
MNodePtr    currentMNodePtr;          ←—146
long        currentNode;
short       done;

localMNodes     = theMTree->MNodes;
        currentNode     = theMTree->rootNode;

done = FALSE;
        while (!done) { currentMNodePtr    = &localMNodes[currentNode];

if (*s != currentMNodePtr->c)
                        currentNode = currentMNodePtr->alternate;
                else {
                        ++s;
                        if (--len == 0)
                                done = TRUE;
                        else
                                currentNode = currentMNodePtr->next;
                } if (currentNode == NONODE)
                        done = TRUE;              ←—148
        }
        return(currentNode);
}
```

Fig. 19

```
#include "MetaTree.h"
void deleteMTree(MTreePtr theMTree, char *s, long len)
{
MNodePtr    localMNodes;
MNodePtr    currentMNodePtr;
long        currentNode;
long        priorToDeleteNode;      ←―150
long        deleteNode;
long        lastNode;
short       done;
localMNodes         = theMTree->MNodes;
currentNode         = theMTree->rootNode;
priorToDeleteNode   = currentNode;
lastNode            = currentNode;

done = FALSE;
while (!done) { currentMNodePtr   = &localMNodes[currentNode];

if (*s != currentMNodePtr->c) {
        lastNode          = currentNode;
        currentNode       = currentMNodePtr->alternate;
        if (currentNode == NONODE) {
            done = TRUE;          ←―152
        }
    }
    else {     ←―154
        if ((localMNodes[lastNode].alternate == currentNode)
          || (currentMNodePtr->alternate != NONODE)) {
            priorToDeleteNode = lastNode;
            deleteNode              = currentNode;
        } lastNode = currentNode;

++s;
        if (--len == 0) {                                      deleteNode
            deleteNode = deleteAlternate(theMTree,priorToDeleteNode,
            deleteRestOfString(theMTree,deleteNode);
            done = TRUE;
        }
        else {
            currentNode = currentMNodePtr->next;
            if (currentNode == NONODE) {
                done = TRUE;
            }
        }
    }
}
}
```

Fig. 21

```
long deleteAlternate(MTreePtr theMTree, long priorNode, long deleteNode)
{
MNodePtr    localMNodes;
MNodePtr    deleteMNodePtr;          ←—156
MNodePtr    priorMNodePtr;
long        nextNode;

if (deleteNode != NONODE) {
            localMNodes     = theMTree->MNodes;
            deleteMNodePtr  = &localMNodes[deleteNode];
            priorMNodePtr   = &localMNodes[priorNode];
  158 ↗    if (priorMNodePtr->next == deleteNode)
                    priorMNodePtr->next = deleteMNodePtr->alternate;
            else if (priorMNodePtr->alternate == deleteNode)
                    priorMNodePtr->alternate = deleteMNodePtr->alternate;
            else
                    return(NONODE);

nextNode = deleteMNodePtr->next;
            freeANode(theMTree,deleteNode);
    }
    return nextNode;         ←—160
}
void deleteRestOfString(MTreePtr
{
MNodePtr    localMNodes;
MNodePtr    deleteMNodePtr;
long        nextNode;

localMNodes     = theMTree->MNodes;

while (deleteNode != NONODE) {
            deleteMNodePtr  = &localMNodes[deleteNode];

nextNode = deleteMNodePtr->next;

freeANode(theMTree,deleteNode);

deleteNode = nextNode;
    }
}
```

Fig. 22

```
#include "MetaTree.h"
long getNewNode(MTreePtr theMTree)
{
long   newNode;

newNode = theMTree->freeNode;
       if (newNode == FREEISATEND) {
              newNode = theMTree->lastNode;

theMTree->lastNode++;
       }
       else {
              theMTree->freeNode = theMTree->MNodes[newNode].next;
       }
       return newNode;
} void freeANode(MTreePtr theMTree, long nodeToFree)
{
       theMTree->MNodes[nodeToFree].next = theMTree->freeNode;
       theMTree->freeNode = nodeToFree;
}
```

Added String 'COLUMBUS'.
Added String 'COMPUTER'.
Added String 'ABCD'.
Added String 'ABC'.

Found String 'COLUMBUS'.
Found String 'COMPUTER'.
Found String 'ABCD'.
Found String 'ABC'.

Deleted String 'ABC'.
Deleted String 'COLUMBUS'.

Could Not Find String 'COLUMBUS'.
Found String 'COMPUTER'.
Found String 'ABCD'.
Could Not Find String 'ABC'.

```
#include "MetaTree.h"

main()
{
MTree  *theMTree;
char   s[50];
long   i;

theMTree = createMTree((long)500);
162
         if (theMTree != NULL) {
             printf("\n");

164          strcpy(s,"COLUMBUS");
             addMTree(theMTree, s, (long)strlen(s) +1L);
             printf("Added String '%s'.\n",s);

strcpy(s,"COMPUTER");
             addMTree(theMTree, s, (long)strlen(s) +1L);
             printf("Added String '%s'.\n",s);

strcpy(s,"ABCD");
             addMTree(theMTree, s, (long)strlen(s) +1L);
             printf("Added String '%s'.\n",s);

strcpy(s,"ABC");
             addMTree(theMTree, s, (long)strlen(s) +1L);
             printf("Added String '%s'.\n",s);
166          printf("\n");

strcpy(s,"COLUMBUS");
             if (!seekMTree(theMTree, s, (long)strlen(s) +1L))
                   printf("Could Not Find String '%s'.\n",s);
             else
                   printf("Found String '%s'.\n",s);

strcpy(s,"COMPUTER");
             if (!seekMTree(theMTree, s, (long)strlen(s) +1L))
                   printf("Could Not Find String '%s'.\n",s);
             else
                   printf("Found String '%s'.\n",s);

strcpy(s,"ABCD");
             if (!seekMTree(theMTree, s, (long)strlen(s) +1L))
                   printf("Could Not Find String '%s'.\n",s);
             else
                   printf("Found String '%s'.\n",s);

strcpy(s,"ABC");
             if (!seekMTree(theMTree, s, (long)strlen(s) +1L))
                   printf("Could Not Find String '%s'.\n",s);
             else
                   printf("Found String '%s'.\n",s);
```

Fig. 27

```
        printf("\n");

strcpy(s,"ABC");
        deleteMTree(theMTree, s, (long)strlen(s) +1L);
        printf("Deleted String '%s'.\n",s);

strcpy(s,"COLUMBUS");
        deleteMTree(theMTree, s, (long)strlen(s) +1L);
        printf("Deleted String '%s'.\n",s);
   168⟶printf("\n");

strcpy(s,"COLUMBUS");
        if (!seekMTree(theMTree, s, (long)strlen(s) +1L))
                printf("Could Not Find String '%s'.\n",s);
        else
                printf("Found String '%s'.\n",s);

strcpy(s,"COMPUTER");
        if (!seekMTree(theMTree, s, (long)strlen(s) +1L))
                printf("Could Not Find String '%s'.\n",s);
        else
                printf("Found String '%s'.\n",s);

strcpy(s,"ABCD");
        if (!seekMTree(theMTree, s, (long)strlen(s) +1L))
                printf("Could Not Find String '%s'.\n",s);
        else
                printf("Found String '%s'.\n",s);

strcpy(s,"ABC");
        if (!seekMTree(theMTree, s, (long)strlen(s) +1L))
                printf("Could Not Find String '%s'.\n",s);
        else
                printf("Found String '%s'.\n",s);
        printf("\n");

disposeMTree(theMTree);
    }
    else
        printf("Could Not Allocate Mem for MetaTree.\n");
}
```

Fig. 28

MTREE DATA STRUCTURE FOR STORAGE, INDEXING AND RETRIEVAL OF INFORMATION

BACKGROUND OF THE INVENTION

1. Field of the Invention

The present invention relates to storing and accessing digital information and, more particularly, to tree configurations by which digital information is stored in a memory and accessed by a processor.

2. Background of the Invention

In a typical computer, data units are stored in a linear manner, a given amount of data occupying a commensurate amount of memory. Many algorithms have been proposed for storing and accessing such data. Many of these algorithms require the imposition upon the data itself of unwieldy processing structures to enable storage and access. These algorithms have involved linear searching, binary searching, hashing and indexing. Such storage and access configurations have been characterized by unduly large memory requirements and unduly slow speeds.

OBJECTS OF THE INVENTION

The primary object of the present invention is to provide a tree-like storage and access configuration for elements of data units, wherein data units are heavily concentrated and rapidly accessed by allocation of the elements to nodes, some of which are common to elements of different data units to ensure minimal memory requirements and maximum access speed.

More particularly, the present invention contemplates a digital computation system that includes a processor and a memory for executing digital programs via logical nodes representing data elements and having particular characteristics. The system includes coded instructions and coded data elements, as follows. The processor establishes, in the memory, a tree of nodes that are interrelated by a particular distribution of pointers. The nodes include predecessor nodes and successor nodes. The pointers include progressions of what may be called Next pointers and Alternate (Alt) pointers. The arrangement is such that each node is associated with a Next pointer and an Alt pointer. A progression of Next pointers establishes a progression of nodes corresponding to a unique data unit, and a progression of Alt pointers establishes a progression of nodes corresponding to a unique path. Data elements connected by successive Alt pointers are in effect Alt lists.

The processor accesses progressions of the nodes in correspondence with progressions of data elements. Selected elements of different data in selected successor nodes are different for different data units in order to uniquely identify the different data units. And selected elements of different data units in selected predecessor nodes are common to the different data units for dense storage and quick access.

For convenience, a tree embodying the present invention is referred to as an MTree. An MTree according to the present invention is used to store data in such a way that the storage and manipulation of the data become extremely practical and efficient. This structure has the following major advantages over standard data storage techniques: (1) a constant search time-mathematical search time=O(1); (2) a constant sort time-mathematical sort time=O(1); (3) automatic data encryption; (4) non-duplication of redundant data elements; (5) slow memory growth for massive amounts of data; and (6) extremely fast relational functionality between two or more MTrees.

BRIEF DESCRIPTION OF THE DRAWINGS

For a fuller understanding of the nature and objects of the present invention, reference is made to the following specification which is to be taken in connection with the accompanying drawings wherein:

FIG. 9 illustrates certain principles of the data file of FIG. 8;

FIG. 10 illustrates further principles of the data file of FIG. 8;

FIG. 11 shows preprocessor directive code according to the present invention;

FIG. 12 shows further preprocessor directive code according to the present invention;

FIG. 13 shows code for creation of an MTree according to the present invention;

FIG. 14 is a flow diagram illustrating the creation of nodal relationships according to the present invention;

FIG. 15 shows a first sequence of code for adding a string to an MTree according to the present invention;

FIG. 16 shows a second sequence of code for adding a string to an MTree according to the present invention;

FIG. 19 shows code for searching for a string according to the present invention;

FIG. 21 shows a first sequence of code for deleting a string according to the present invention;

FIG. 22 shows a second sequence of code for deleting a string from an MTree according to the present invention;

FIG. 26 shows code for allocating nodes according to the present invention;

FIG. 27 shows main code illustrating an example of combined addition, deletion and searching according to the present invention;

FIG. 28 shows code continuing the example of FIG. 27; and

FIG. 29 shows the output of the code of FIGS. 27 and 28.

DETAILED DESCRIPTION OF THE PREFERRED EMBODIMENT

Figure 1:
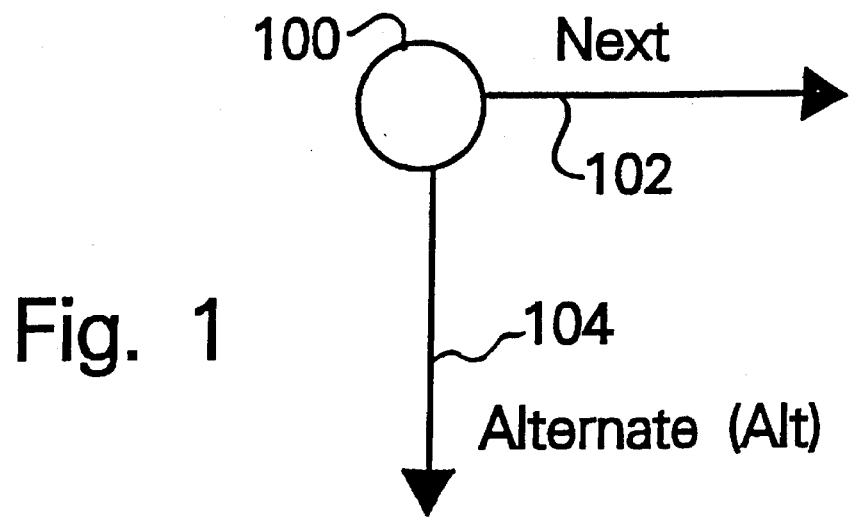
FIG. 1 shows details of a node embodying principles of the present invention.
Figure 2:
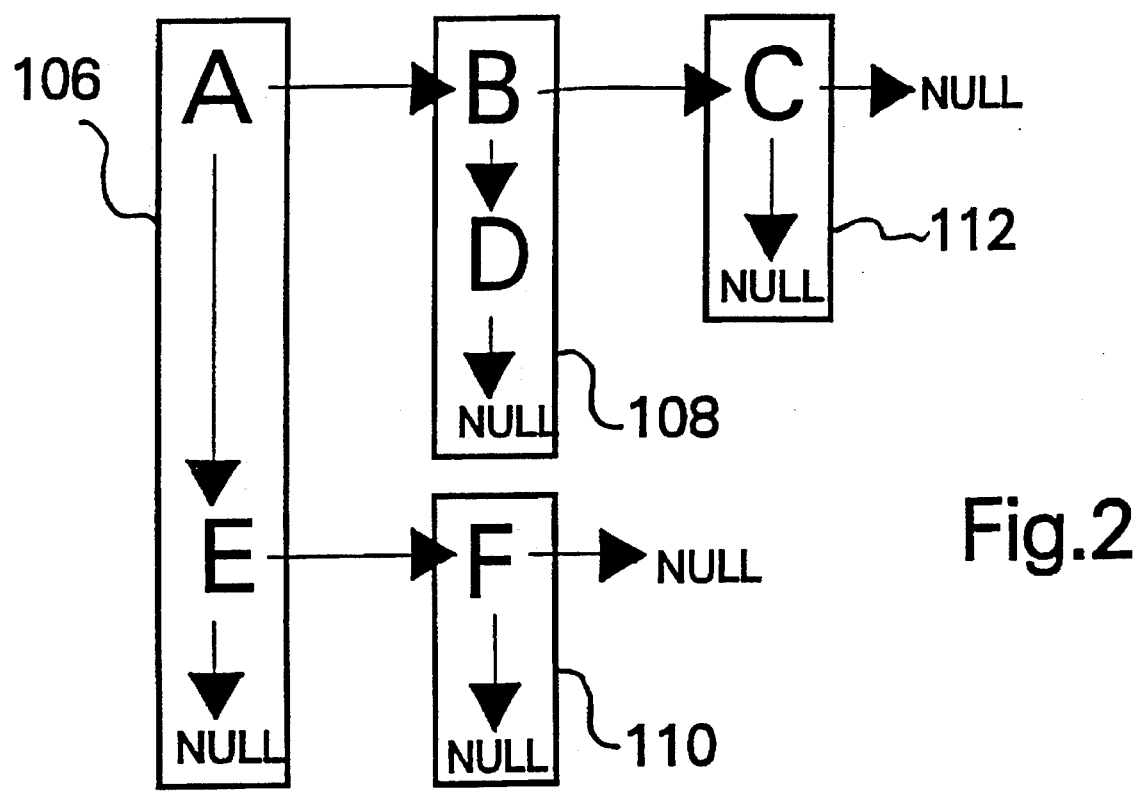
FIG. 2 shows relationships among nodes according to the present invention.

Introduction—FIGS. 1 and 2

The essence of the MTree is its structure. The MTree structure of the present invention is sharply different from prior organizational and compression techniques. Basically, the MTree includes individual nodes that are composed of successive data elements (e.g. successive individual characters) of the data to be processed. The MTree is constructed so that the final element (e.g. character) of each unit of data is at a unique position (e.g. node) in the MTree.

This structure, for example, is adapted to be used easily in database configurations. In one configuration, such use involves one MTree per field (attribute) over a range of records (tuples). The MTree, in one form, is used as the data file itself. In another form, it is used as an index to an existing data file to provide fast searches and sorts, as well as quick relational functionality. In any case, each unit of data in the MTree also must describe its relationship in the overall data file, e.g. what record (tuple) it is in. This information, according to the present invention, is attached to the end node of each individual unit of data in the MTree. This structure is practical to maintain because data can be added or removed from the structure inconstant time.

As indicated above, the features of the present invention as illustrated herein, for simplicity, refer to ASCII characters as the elements of data being processed. It is to be understood, however, that this data element format is merely illustrative of a broad range of other data element formats. Such other data element formats, for example, include binary numbers as well as single bits.

FIG. 1 illustrates the general form of a node 100, which includes an element of a data unit, e.g. a string, an integer, a boolean, a real number, etc. This node also includes a Next pointer 102, and an Alt pointer 104. The operation of Next and Alt pointers is illustrated in FIG. 2 in reference to strings of text characters. The MTree depicted describes only the following set of three strings: ABC; AD; EF. More generally, a string or other data unit is represented by a set of those nodes in a logically continuous path of Next and Alt pointers, wherein the predecessor node for any Alt pointer serves merely to distinguish between data units, and the successor node for that Alt pointer serves as a continuation on the string or other data unit. A node is capable of being a Next node and an Alt node at the same time. A specific subset of the aforementioned set is the succession of those nodes in a logically continuous path of Next pointers wherein there are no intervening Alt pointers that are operative in that continuous path.

Characters associated with a succession of Alt pointers can be seen to constitute a list, different successions of Alt pointers establishing different lists. As shown in FIG. 2, the three strings referred to above (ABC; AD; EF) are established by four lists 106, 108, 110, 112. It will be observed, for example, that list 106 is the list having contents which are all of the different characters that occur in the first character position of all of the strings in the set of strings that are initiated in that list.

It will be observed that the speed of determining whether or not some query string is in an MTree is directly dependent on the number of different characters in an Alt list. Also, for every character in the query string, one and only one Alt list must be searched. For example, a 5 query character string means that 5 Alt lists must be searched. If the data type is a one byte ASCII character (8 bits), there will be 256 possible data elements in an Alt list. If the data type is one bit, there will be only two possible data elements in the Alt list.

Figure 3:
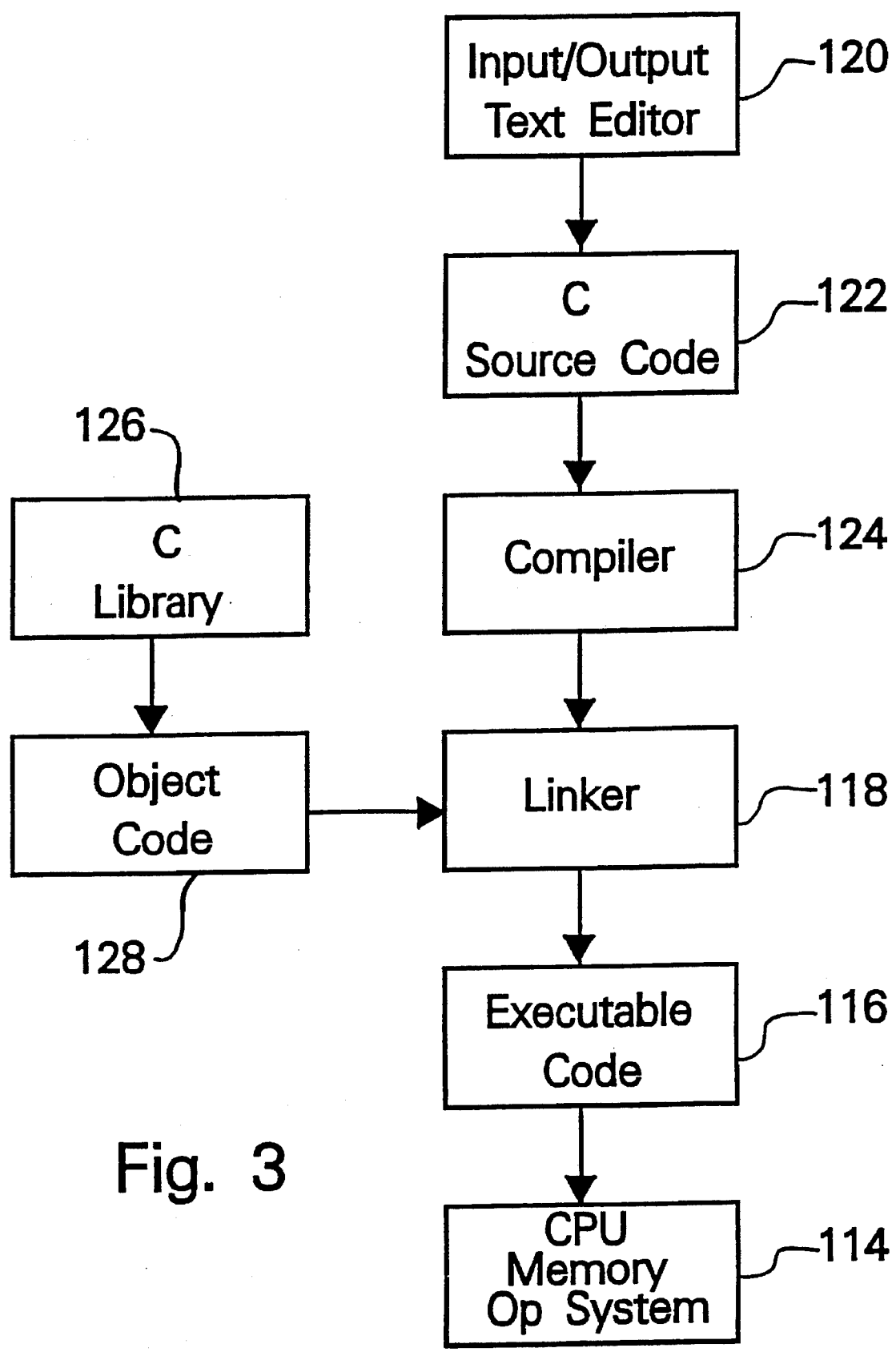
FIG. 3 is a block diagram of a digital data processing system incorporating a preferred embodiment of the present invention.

Computer Configuration—FIG. 3

The code and flow charts to be described below have been implemented in a digital computation system as shown in FIG. 3. This system includes an architecture 114 including a central process unit (CPU), a memory and an operating system, which is programmed by an executable code, i.e. a machine code, 116. In the illustrated system, executable code 116 is generated via a linker 118, by two inputs. The first input is an input output (I/O) unit including a text editor 120, a source code 122 in the C programming language and a C compiler 124. The second input is a C programming library 126 and an object code 128. In the illustrated embodiment: the CPU and memory incorporate a Motorola 68000 chip; the executable code includes a complex instruction set (CISC); and the operating system is the Macintosh platform. The programming language, as stated above, is C, a mid-level language, more specifically that version of C sold by Symantec under the trade designation "Think C".

It is to be understood that the principles of the present invention are applicable to digital computation systems other than as shown in FIG. 3. For example, in alternative embodiments: the architecture incorporates either Intel 386 or 486 CISC chips or IBM RS/6000 reduced instruction set (RISC) chips; the operating system incorporates DOS, OS/2, A/UX or UNIX; and the programming language is either another version of C, or such a high level language as PASCAL, COBOL, BASIC, etc.

Figure 4:
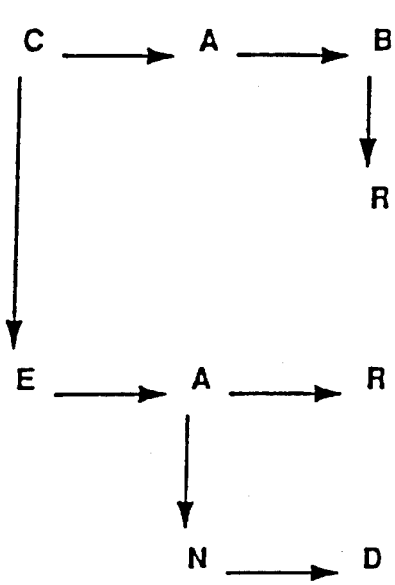
FIG. 4 illustrates a typical relationship among nodes according to the present invention.

Simple Example of MTree Structure—FIG. 4

FIG. 4 shows a standard MTree containing four unique units of text data-the words CAB, CAR, EAR and END. Each character in the MTree is a data element that represents one node. As stated above, each node has two pointers, a rightward pointer representing a node's Next pointer, and a downward pointer representing a node's Alt pointer. The set of nodes connected by Alt pointers constitutes an Alt list. It is to be noted that adding any new word beginning with the letter "C" allocates no new memory for its first letter. In other words, an existing "C" node will be used for every word in the relevant MTree containing "C" as its first letter. Hence the slow memory growth of the MTree structure.

Figure 5:
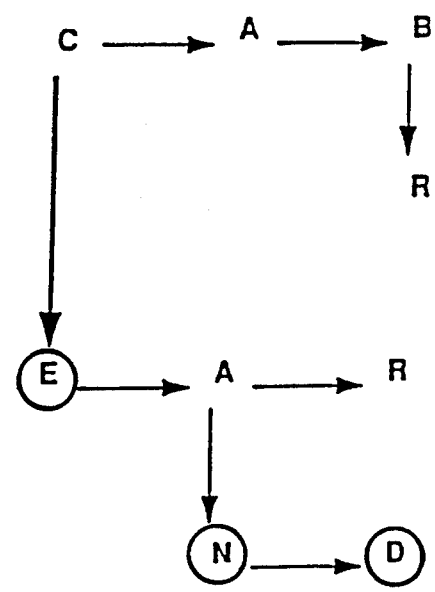
FIG. 5 illustrates searching according to the present invention.

Simple Example of MTree Searching—FIG. 5

In FIG. 5, to find the word "END", a scan begins at the "C" node and traverses through the pointers of the Alt list for "E", the first character in the word "END". Thereafter, the scan proceeds to the Next pointer of the "E" node, which is "A", and then continues down the Alt list searching for "N". Thereafter, the scan proceeds to the "N" node's Next pointer searching for "D". The progression of matches for the word "END" is indicated by the encircled letters E, N and D. The rest of the MTree is ignored in the course of this search. It is to be noted that the search for any word begins by assessing what may be called the first relevant or Root node, in this case "C." The scan begins at the first character in the Root node's Alt list. After finding that character by traversing the first Alt list, the scan continues via the next pointer down the following Alt list for the second character in the word. This procedure is continued until all contiguous successor nodes have been scanned and their locations identified.

Figure 6:
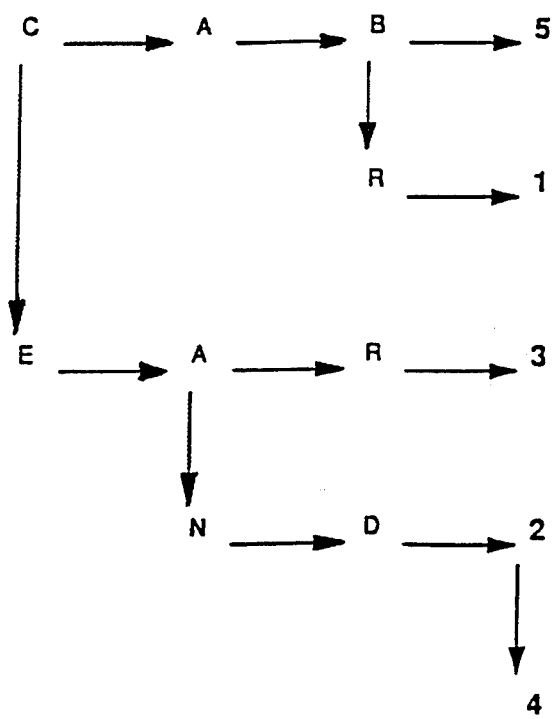
FIG. 6 illustrates indexing in a data file according to the present invention.
Figure 7:
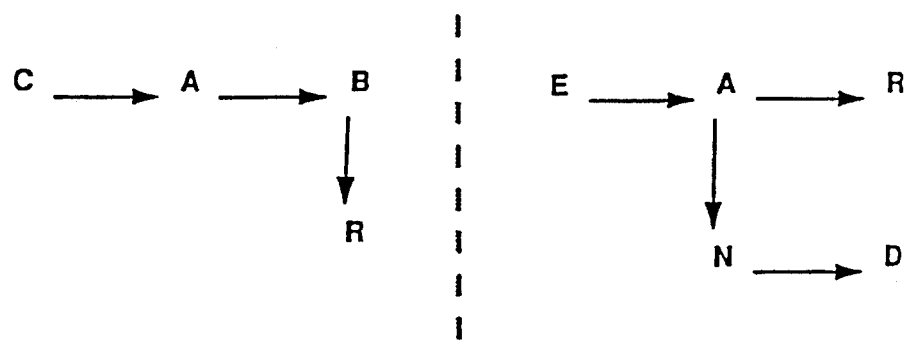
FIG. 7 illustrates multiple records according to the present invention.

Simple Example of Sorting and Indexing—FIG. 6

The structure in this example is already sorted in alphabetic order. Sorting involves scanning through the MTree, first across the progression of Next pointers and then down the progression of Alt pointers. Since an MTree data file contains one MTree per field, a file can be sorted by choosing the MTree of a selected field to sort the entire MTree data file. In other words, a non-match causes the scan to proceed to an Alt node, and a match causes the scan to proceed to a Next node.

The MTree structure of FIG. 6 illustrates how MTree data file indices may be set up. At the end of a word in the MTree, there is placed a record identifier (ID) in the form of a number uniquely identifying that word as a record. Thus, in the present example, there are the following records by ID:

1 CAR

2 END

3 EAR

4 END

5 CAB

It is to be noted that the word "END" occurs in two records but only once in the MTree structure, thereby saving memory. These two words, "END", are distinguished by their record ID's. It should be noted that the code of the above example, for ease of explanation, does not maintain a sorted MTree.

Simple Example of an MTree Data File FIGS. 7–10

In this case, the, data is shown as having two fields and two records as follows:

record 1
 field 1 CAR
 field 2 EAR record 2
 field 1 CAB
 field 2 END

There are two MTrees, one for each field. There is a record ID at the end of each word, but both "CAR" and "EAR" point to record 1, and "CAB" and "END" point to record 2.

Figure 8:
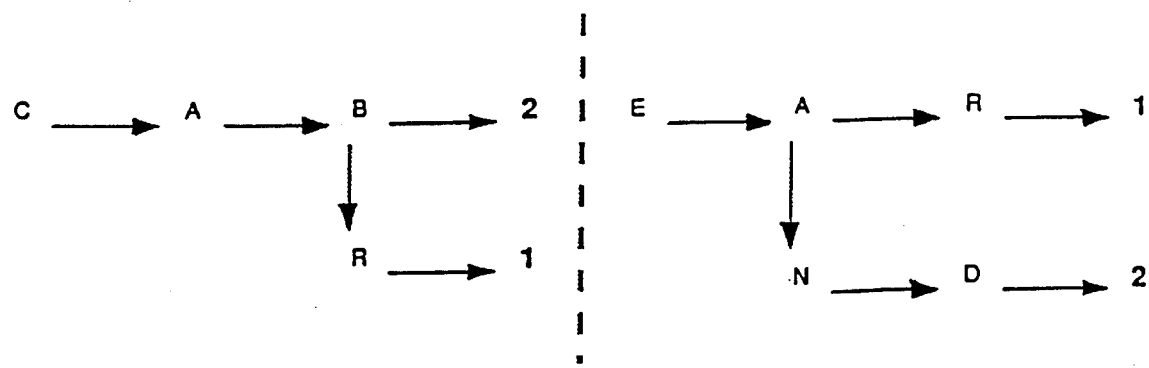
FIG. 8 illustrates indexing of the multiple records of FIG. 7.
Figure 17:
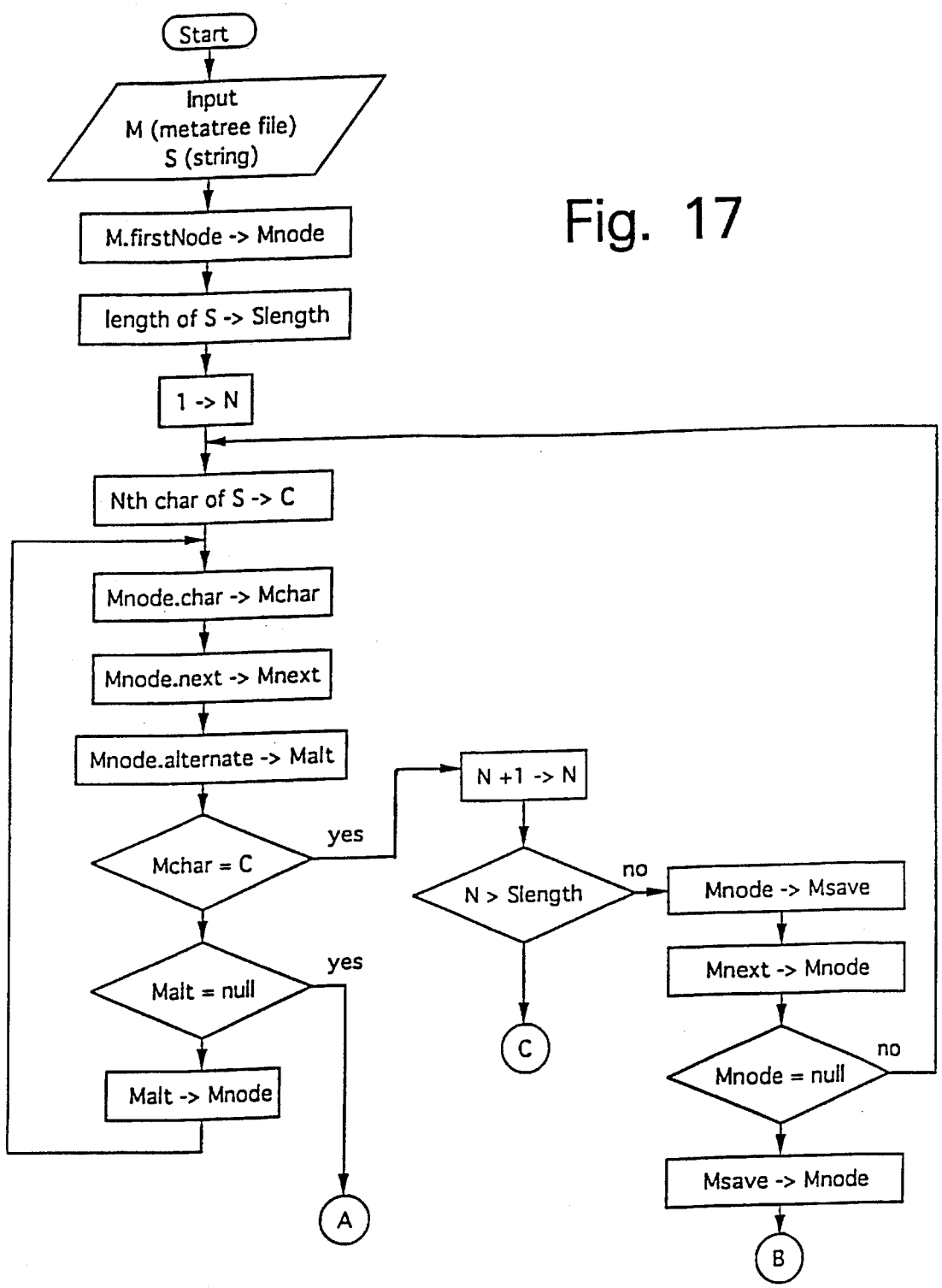
FIG. 17 is a flow diagram illustrating a first sequence of steps for adding a string according to the present invention.
Figure 18:
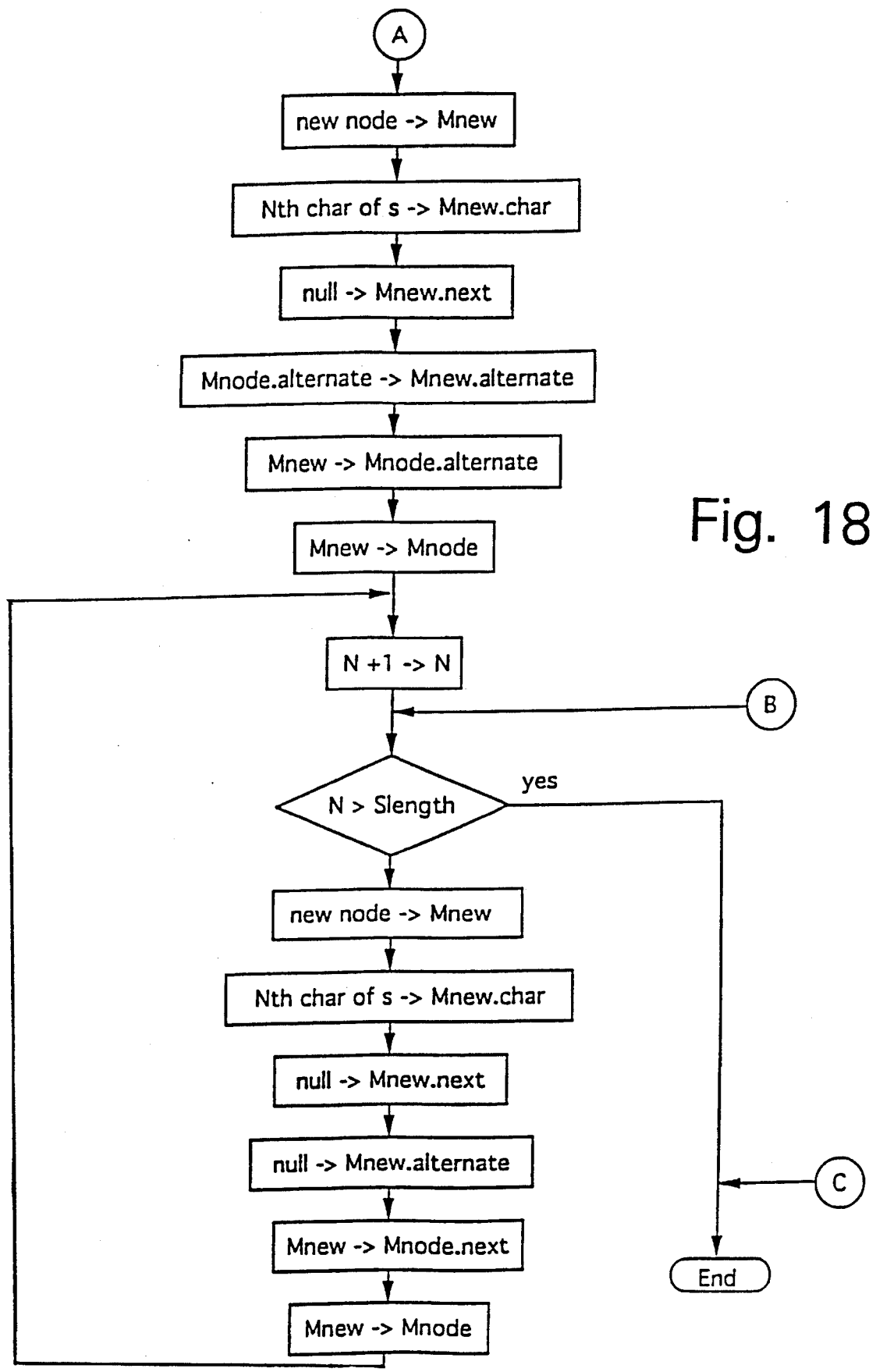
FIG. 18 is a flow diagram illustrating a second sequence of steps for adding a string according to the present invention.

In reference to FIG. 8, it will be noted that "CAR" in the first field uses the Next pointer after its record ID to point to the word "CAR" in the second field. In this way the second field can be found. But also "CAR" uses the Next pointer after its record ID, in a manner to be described more fully below, to point back to "CAR" so that from any field all the field's contents for a particular record can be found.

In reference to FIG. 8, if the word "CAR" has been found, then the Next pointer after record ID 1 is followed. This leads to a node in the second MTree designating record ID 1. However, at this point, there is no way of knowing what word is represented by record ID 1 in the second MTree. In order to find this word, it is necessary to trace back in the MTree to find all the nodes that constitute the word associated with record ID 1 in the second field.

Operation of Back Pointer—FIGS. 9 and 10

The aforementioned tracing back operation is associated with what may be termed Back pointers.

A Back pointer is constituted by an open Alt pointer at the end of an Alt list. It is to be recalled that alternate characters are connected by Alt pointers. But the last alternate character in an Alt list by definition is not needed to designate a further alternate character. Thus, this last alternate pointer is available for use as a Back pointer. Back pointers follow scanning to the bottom of an Alt list and then direct tracing back to the previous Alt character and list. These Back pointers complete the MTree data file. It is to be noted that, in the present example, for ease of explanation, Back pointer support is omitted.

The C Code of the Preferred Embodiment

As indicated above, the C language is applied herein to illustrate code for performing functions and establishing relationships embodying the present invention. For ease of comprehension, critical functions and relationships, where appropriate, first are shown as C code sequences and then are featured in flow diagrams.

Declarations—FIGS. 11 and 12

In FIGS. 11 and 12, the "#include" statements call conventional C functions from C Library 126, the "#define" statements are preprocessor directives that define selected MTree constants, and the "typedef" statements declare MTree identifiers and data types. The data types and functions—char and long—have their conventional meanings.

In the foregoing declarations, any free node contains a pointer to the Next free node in the MTree. In other words, when any node is free, the Next node pointer incorporates it into a linked list of free nodes. A free node in the MTree points to the first node in the free node list. The value of the last pointer in the free node list is defined as −1. The present implementation uses a long integer to index an array of nodes, so that actual pointers are not used. The nonode identifier rather than the null identifier is used as a terminator. The node structure for this implementation is shown at 130 as including the following: character for this node; character for future expansion; first possible Next character node following this character; other alternate character node instead of this character at this position.

The MTree structure for this implementation is shown at 132 as including: position of first or Root node—always 0 in this implementation; position of first free node in Mtree (memory); last position of unused memory (for use with the free node); number of nodes this Mtree requires in memory; actual memory allocated for this Mtree.

In FIG. 12, the functions for use in the illustrations below—create, dispose, add, delete, seek, get and free— uniquely configure the MTree in a manner to be described below.

Creating an MTree—FIGS. 13 and 14

In FIG. 13, the illustrated implementation for simplicity uses an all memory Mtree. However, most applications, as a practical matter, will require more memory than is available by simple allocation. The function "malloc" as shown in FIG. 13 has its conventional meaning. In FIG. 14, the first node is shown as being created with null properties.

Adding a String to the MTree—FIGS. 15–18

Adding a string of len length to the MTree is implemented at 134 as follows: local mnodes are accessed to avoid dereferencing; the pointer to current node serves to avoid dereferencing; an index is defined for local nodes of the current node; and an index is defined for the last node. At 136, a new alternate character and add function for the rest of the string are inserted. At 138, the rest of the string is added. This occurrence is avoided if all strings have a standard termination, i.e. characters which can only occur at the end of a string. At 136, the first character is added to the alternate list with the current node as a node in that alternate list. In other words, a new node is inserted with the first character going into the alternate list. At 140, local nodes and the pointer to the current node are accessed to avoid dereferencing.

Execution of the program continues in FIG. 16. At 142, new nodes are added for each of the characters successively, the routine is begun with the Next pointer of the current node, and nodes are added onto the Next pointers. At 144, local nodes and the pointer to the current node are accessed to avoid dereferencing.

Figure 20:
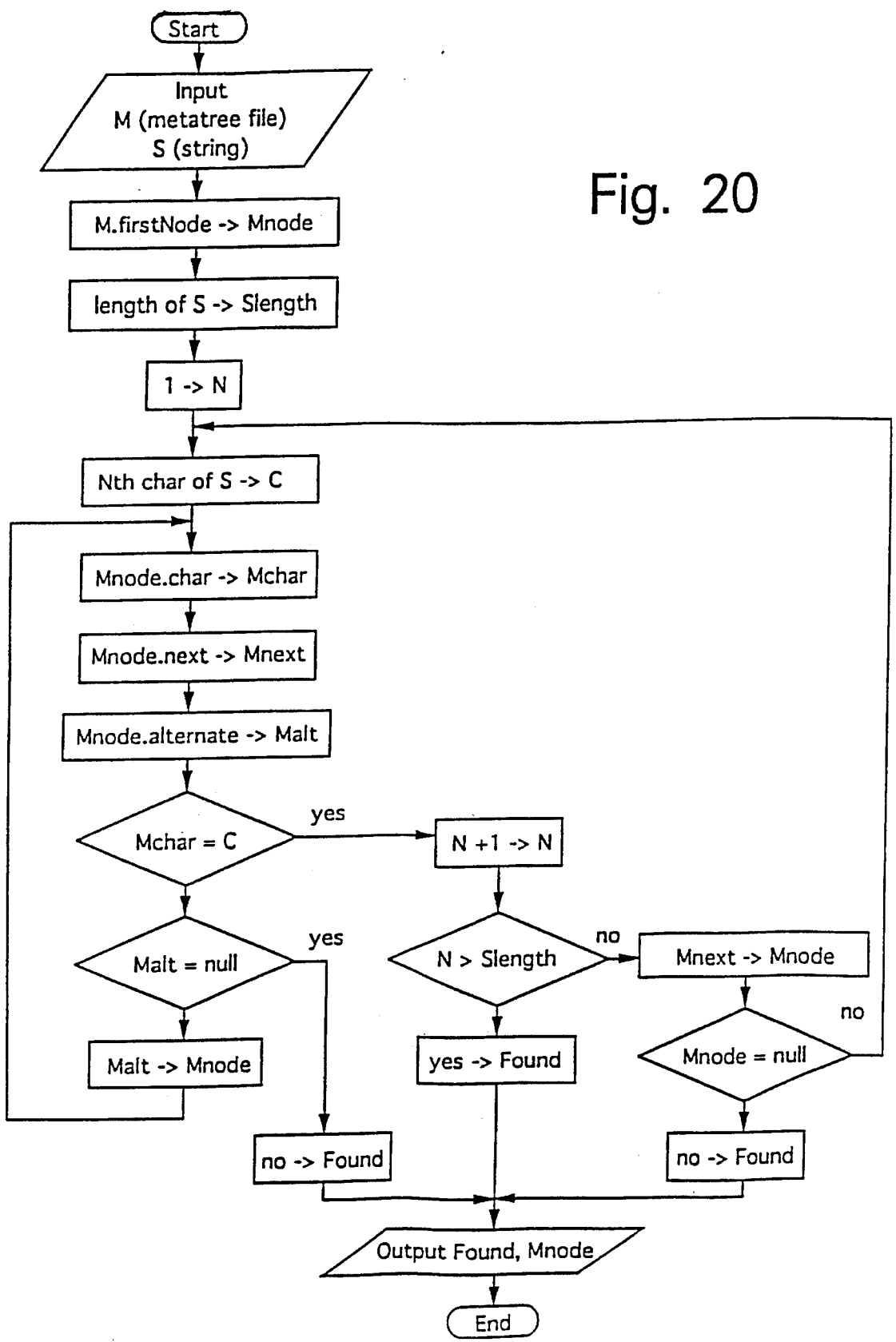
FIG. 20 is a flow diagram illustrating a sequence of steps for searching for a string according to the present invention.
Figure 23:
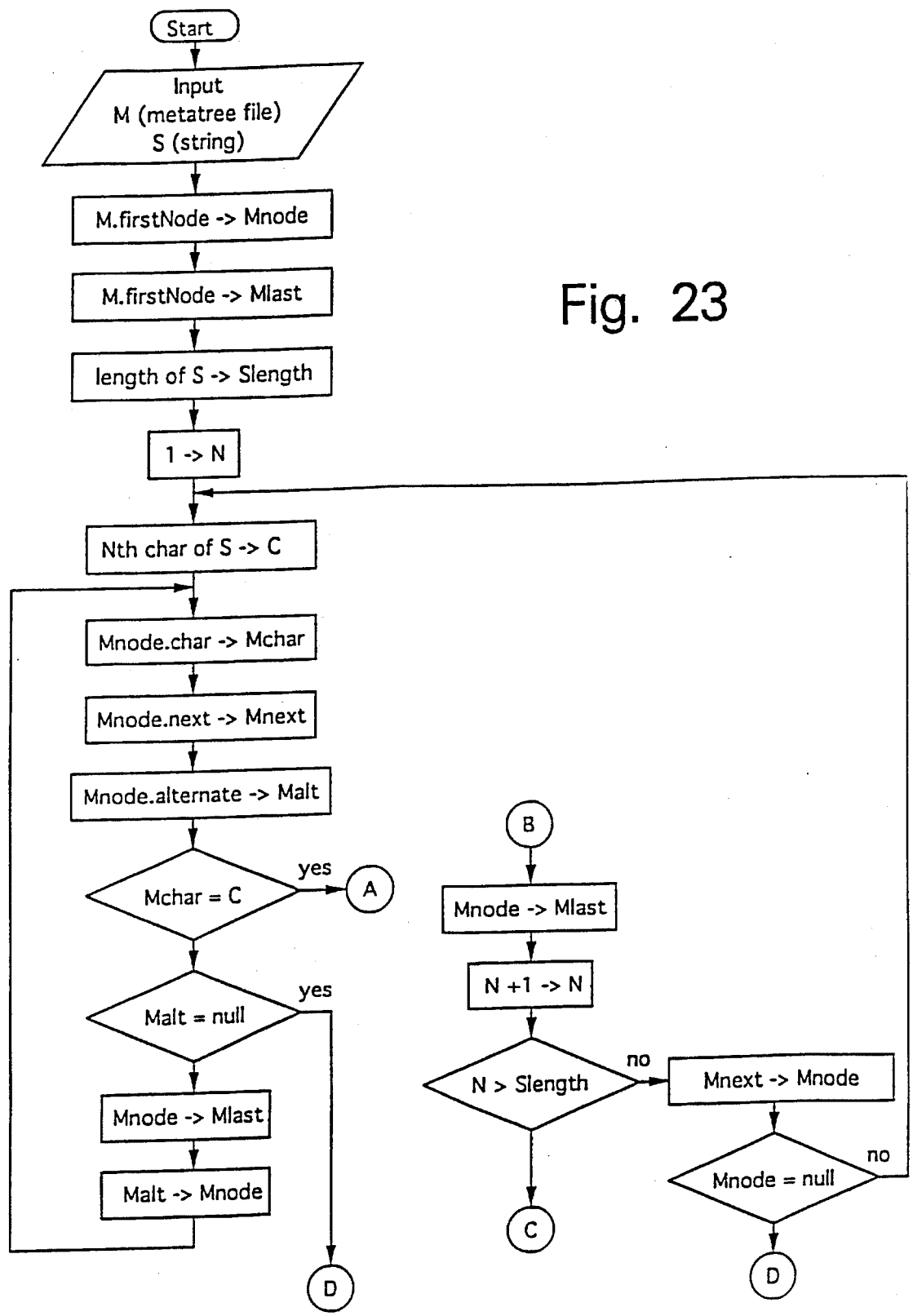
FIG. 23 is a flow diagram illustrating a first sequence of steps for deleting a string according to the present invention.
Figure 24:
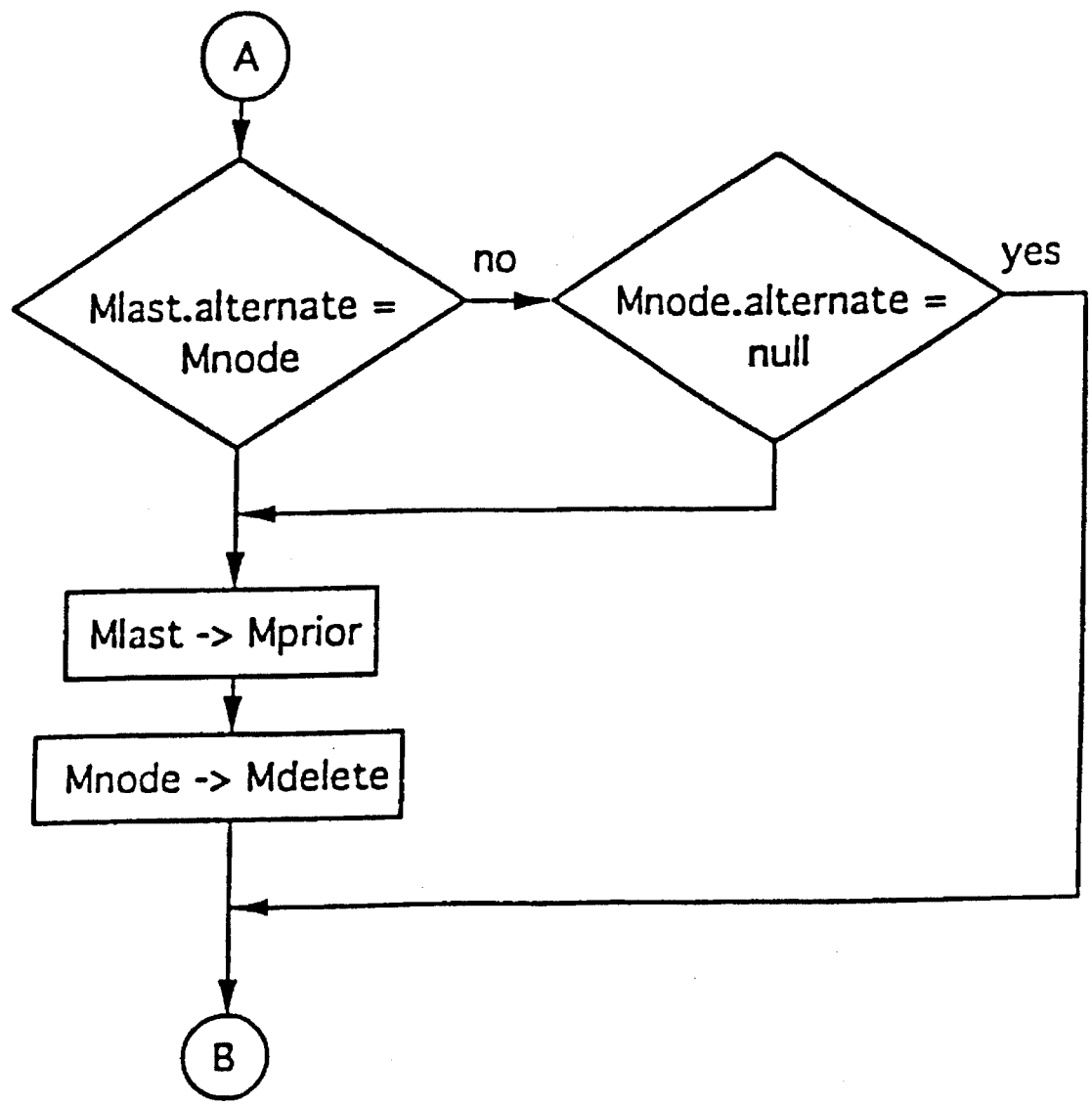
FIG. 24 is a flow diagram illustrating a second sequence of steps for deleting a string according to the present invention.
Figure 25:
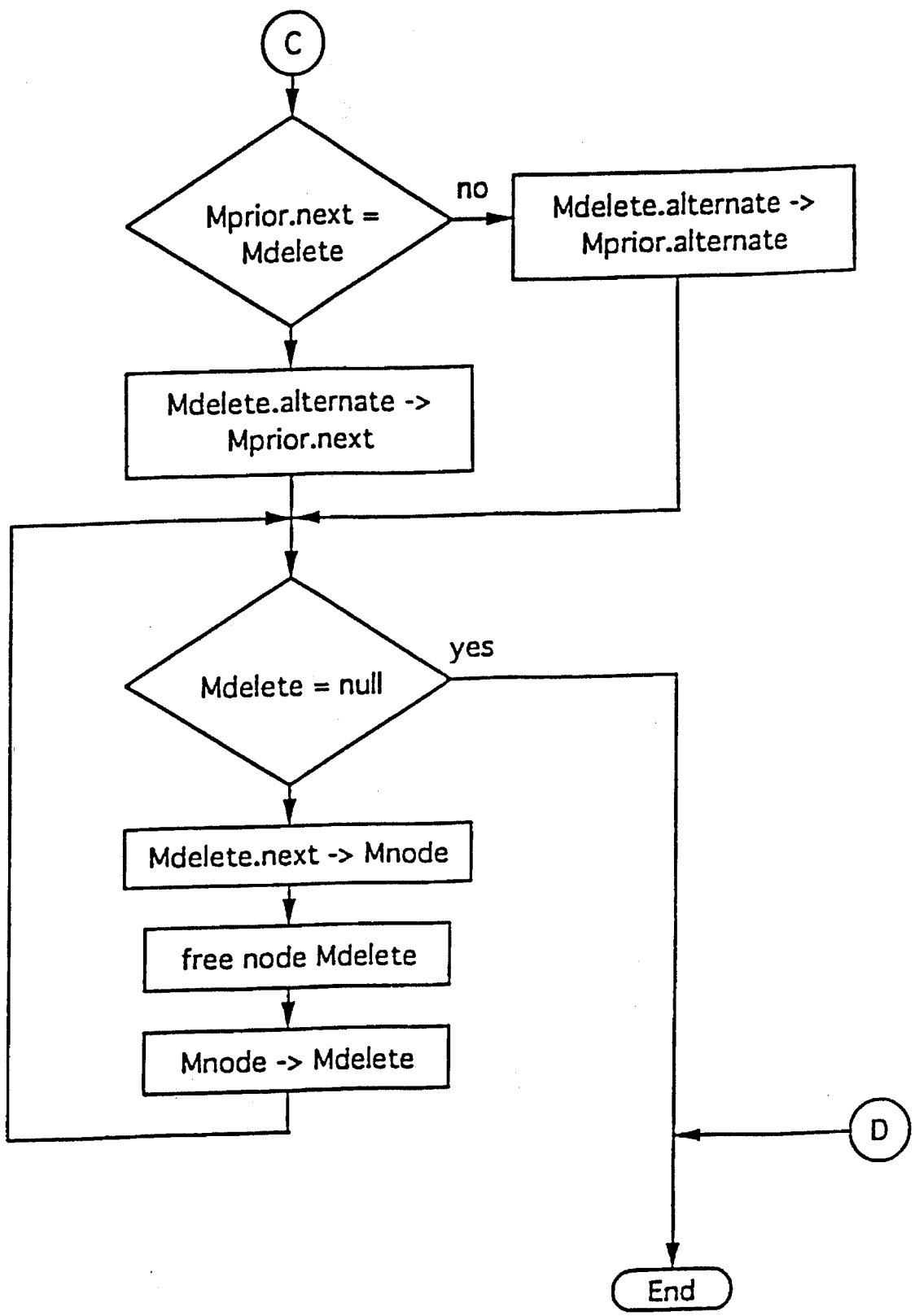
FIG. 25 is a flow diagram illustrating a third sequence of steps for deleting a string according to the present invention.

Searching for a String—FIGS. 19 and 20

This routine determines if a given string of a given length is in an MTree. If it is, then the value returned is the pointer to the node containing the last character of the string. In this way, some other routine can use that pointer. The sequence at 146 is such that local nodes and the pointer to current node are accessed to avoid dereferencing. Then the local nodes of current node are indexed. When the boolean becomes TRUE, the search is terminated. If the current node is non-NULL, then a perfect match is indicated. If the current node is NULL, then there is no match.

Deleting a String—FIGS. 21–25

The delete function will operate only if all strings have the same termination character, or if all strings are followed by the same number of characters after some termination character. For example, this requirement is met when zeros terminate the strings and these zeros are added to the MTree. Alternatively, for example, the delete function will operate if the MTree is used as an index to some data file, and the strings have zero terminators followed by constant byte lengths, (i.e. record counters or record identifiers).

At 150: local nodes and a pointer to the current node are accessed to avoid dereferencing; local nodes of the current node are indexed; the node pointing with a Next or Alt pointer accesses to the delete node; and the delete and last nodes of the alternate list are indexed.

As at 152, where the string is not in the MTree, no deletion is indicated. As at 154, if the current node is part of an Alt list, then the delete node, i.e. the node where deletion starts, is set to the current node. At 156, to delete a node the pointers around the node to be deleted must be circumvented and then that node is freed. Local nodes, the pointer to the delete node, and the pointer to the predecessor node are accessed to avoid dereferencing. A return node is designated for accessing the rest of the string. As at 158, if the predecessor node's Next pointer is directed to the delete node, then the delete node is the first node in an Alt list. Therefore, the predecessor node's Next pointer will be directed to the delete node's Alt pointer. Otherwise, if the predecessor node's Alt pointer is directed to the delete node, then the predecessor node is part of the same Alt list as the delete node, and the predecessor node's Alt pointer will be directed to the delete node's Alt pointer, thus bypassing the delete node. As at 160, all the nodes are removed from delete node along delete node's successor path.

Node Allocation—FIG. 26

This routine involves simple memory management. Nodes are allocated as needed, but memory must already be reserved in the MTree. When nodes are freed, a linked list of the free nodes is maintained by using the Next pointer of each node to determine the next available free node. The last item in the linked list contains the identifier FREEISATEND signifying that the Next node is to be allocated from remaining memory in the MTree. To keep the code simple for this example, there is no error checking to determine if no more memory is available in the MTree.

A Main Program—FIGS. 27–29

This example shows addition, deletion and searching. As of 162, an MTree is created. The size of the MTree chosen must be large enough to accommodate the program but otherwise is arbitrary. As at 164 strings of length +1 are added so that the zero terminator character will be added. The zero terminator character guarantees that substrings will not exist, so that, for example, "ABCD" does not imply "ABC". As at 166, a determination is made whether or not adding occurred. As at 168, a determination is made as to whether or not deletion occurred correctly.

What is claimed is:

1. In computation means including processor means and memory means for executing digital programs, said programs including coded instructions and coded data, the improvement wherein:

(a) said processor means establishes in said memory means a tree of nodes that are interrelated by a distribution of pointers;

(b) said tree of nodes including predecessor nodes and successor nodes;

(c) said distribution of pointers including progressions of next pointers and alternate pointers;

(d) said processor means accessing progressions of said nodes in correspondence with progressions of elements of said coded data;

(e) each of said progressions of nodes being associated with at least one index, wherein said index gives said progression of nodes the means (1) to locate one or more other progressions of nodes within said tree of nodes, (2) to permit one or more other progressions of nodes from said tree of nodes to locate said progression of nodes, (3) to locate one or more external objects, and (4) to permit one or, more external objects to locate said progression of nodes;

(f) selected elements of different data units in selected progressions of successor nodes being different for different data units in order to uniquely identify said different data units; and (g) selected elements of different data in selected predecessor nodes being common to said different data in order to achieve a high concentration of said data in said memory means and to achieve rapid accessibility of said different data by said processor means.

2. The computation means of claim 1 wherein: each node includes a next pointer and an alternate pointer; and said progressions of next pointers and alternate pointers are operative to provide progressions of nodes corresponding to selected sequences of said elements.

3. The computation means of claim 1 wherein a progression of alternate pointers records a list.

4. The computation means of claim 1 wherein said tree of nodes contains a linked list of free nodes, said processor means accessing said linked list of free nodes in order to add nodes to said progressions of nodes.

5. The computation means of claim 1 wherein the final element of each unit of said data is in a unique position in said tree.

6. A computation means including processor means and memory means for executing digital programs, said programs including coded instructions and coded data, the improvement wherein:

(a) said processor means establishes in said memory means a plurality of trees of nodes that are interrelated by a plurality of distributions of pointers;

(b) each of said trees of nodes including predecessor nodes and successor nodes;

(c) each of said distributions of pointers including progressions of next pointers and alternate pointers;

(d) said processor means accessing progressions of said nodes in correspondence with progressions of elements of said coded data;

(e) each of said progressions of nodes being associated with at least one index, wherein said index gives said progression of nodes the means (1) to locate a progression of nodes in one or more other of said trees and (2) to permit one or more progressions of nodes of other of said tree of nodes to locate said progression of nodes;

(f) selected elements of different data units in selected progressions of successor nodes being different for different data units in order to uniquely identify said different data units; and (g) selected elements of different data in selected predecessor nodes being common to said different data in order to achieve a high concentration of said data in said memory means and to achieve rapid accessibility of said different data by sail processor means.

7. The computation means of claim 6 wherein: each node includes a next pointer and an alternate pointer; and said progressions of next pointers and alternate pointers are operative to provide progressions of nodes corresponding to selected sequences of said elements.

8. The computation means of claim 6 wherein a progression of alternate pointers records a list.

9. The computation means of claim 6 wherein each of said trees of nodes contains a linked list of free nodes, said processor means accessing said linked list of free nodes in order to add nodes to said progressions of nodes.

10. The computation means of claim 6 wherein the final element of each said data unit is in a unique position in said tree.

11. A computation system comprising:

(a) an architecture including a central processing unit, a memory means and an operating system;

(b) said operating system being programmed in a machine code language;

(c) a linker for combining a first input and a second input;

(d) a text editor for said operating system to input data units composed of data elements for generation of a source code;

(e) said source code being in a higher level language than said machine code language;

(f) said central processing unit establishing in said memory means a plurality of trees of nodes that are interrelated by a plurality of distributions of pointers;

(g) each of said trees of nodes including predecessor nodes and successor nodes;

(h) each of said distributions of pointers including progressions of next pointers and alternate pointers;

(i) said central processing unit accessing progressions of said nodes in correspondence with progressions of elements of coded data;

(j) each of said progressions of nodes being associated with at least one index, wherein said index gives said progression of nodes the means (1) to locate a progression of nodes in one or more other of said trees and (2) to permit one or more progressions of nodes of other of said tree of nodes to locate said progression of nodes;

(k) selected elements of different data units in selected progressions of successor nodes being different for different data units in order to uniquely identify said different data units; and (l) selected elements of different data in selected predecessor nodes being common to said different data in order to achieve a high concentration of said data in said memory means and to achieve rapid accessibility of said different data by said central processing unit.

12. The computation system of claim 11 wherein: each node includes a next pointer and an alternate pointer; and said progressions of next pointers and alternate pointers are operative to provide progressions of nodes corresponding to selected sequences of said elements.

13. The computation system of claim 11 wherein a progression of alternate pointers records a list.

14. The computation system of claim 11 wherein each of said trees of nodes contains a linked list of free nodes, said central processing unit accessing said linked list of free nodes in order to add nodes to said progressions of nodes.

15. The computation system of claim 11 wherein the final element of each said data unit is in a unique position in said tree.

16. A computation means including processor means and memory means for executing digital programs, said programs including coded instructions and coded data, the improvement wherein:

(a) said processor means establishes in said memory means a tree of nodes that are interrelated by a distribution of pointers;

(b) said tree of nodes including predecessor nodes and successor nodes;

(c) said distribution of pointers including progressions of next pointers and alternate pointers;

(d) said processor means accessing progressions of said nodes in correspondence with progressions of elements of said coded data;

(e) said progressions of next pointers and alternate pointers are operative to provide progressions of nodes corresponding to selected sequences of said elements;

(f) each of said progressions of nodes being associated with at least one index, wherein said index gives said progression of nodes the means (1) to locate one or more other progressions of nodes within said tree, (2) to permit one or more other progressions of nodes from said tree to locate said progression of nodes, (3) to locate one or more external objects, and (4) to permit one or more external objects to locate said progression of nodes;

(g) selected elements of different data in selected progressions of successor nodes being different for different data in order to uniquely identify said different data;

(h) selected elements of different data in selected predecessor nodes being common to said different data in order to achieve a high concentration of said data in said memory means and to achieve rapid accessibility of said different data by said processor means;

(i) each node including at least a next pointer and at least an alternate pointer;

(j) said progressions of next pointers and alternate pointers are operative to provide progressions of nodes corresponding to selected sequences of said elements of said coded data;

(k) said elements of said coded data being selected from the class consisting of bits and bytes; and (l) said coded data being selected from the class of data types consisting of strings, booleans, reals and integers.

17. A computation process for application to processor means and memory means for executing digital programs, said programs including coded instructions and coded data, said process including as steps:

(a) establishing in said memory means by said processor means a tree of nodes that are interrelated by a distribution of pointers;

(b) said tree of nodes including predecessor nodes and successor nodes;

(c) said distribution of pointers including progressions of next pointers and alternate pointers;

(d) accessing by said processor means progressions of said nodes in correspondence with progressions of elements of said coded data;

(e) associating with each of said progressions of nodes at least one index, wherein said index gives said progression of nodes the means (1) to locate one or more other progressions of nodes within said tree, (2) to permit one or more other progressions of nodes from said tree to locate said progression of nodes, (3) to locate one or more external objects, and (4) to permit one or more external objects to locate said progression of nodes;

(f) selected data elements of different data in selected progressions of successor nodes being different for different data in order uniquely identify said different data; and (g) selected elements of different data in selected predecessor nodes being common to said different data in order to achieve a high concentration of said data in said memory means and to achieve rapid accessibility of said different data by said processor means.

18. The computation process of claim 17 wherein: each node includes a next pointer and an alternate pointer; and said progressions of next pointers and alternate pointers are operative to provide progressions of nodes corresponding to selected sequences of said elements.

19. The computation process of claim 17 wherein a progression of alternate pointers records a list.

20. The computation process of claim 17 wherein said tree of nodes contains a linked list of free nodes, said processor means accessing said linked list of free nodes in order to add nodes to said progressions of nodes.

21. The computation process of claim 17 wherein the final element of each unit of said data is in a unique position in said tree.

* * * * *